A. GÜNZEL.
PROCESS OF TREATING ORES, &c.
APPLICATION FILED APR. 8, 1910.
1,053,381.
Patented Feb. 18, 1913.
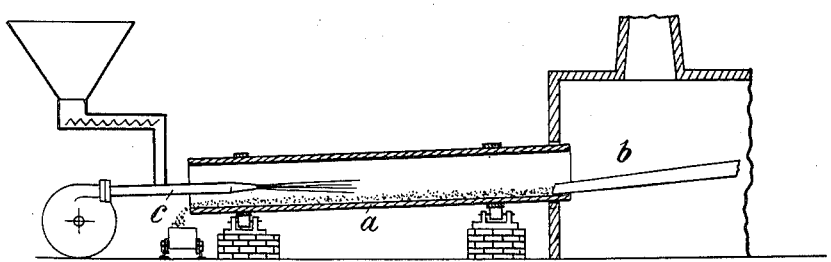

UNITED STATES PATENT OFFICE.

ARNO GÜNZEL, OF ZIEBIGK, NEAR DESSAU, GERMANY.

PROCESS OF TREATING ORES, &c.

1,053,381.  Specification of Letters Patent.  Patented Feb. 18, 1913.

Application filed April 8, 1910. Serial No. 554,150.

*To all whom it may concern:*

Be it known that I, ARNO GÜNZEL, a subject of the German Emperor, residing at Am Georgengarten, Ziebigk, near Dessau, Germany, have invented certain new and useful Improvements in Processes of Treating Ores, &c., of which the following is a specification.

This invention relates to the treatment of cement, ores and the like materials, in that type of rotary furnace in which the burning zone, the partial cooling zone and the final cooling zone are all located in a single revolving furnace tube.

The essential feature of the invention is the employment of increased pressure for feeding the fuel into the furnace, whereby the fuel-feed nozzle may be made shorter. By thus increasing the pressure with which the fuel is fed into the furnace, it is possible, even with the use of a short nozzle, to locate the smelting of reducing zone sufficiently far back in the interior of the furnace to allow adequate cooling of the material under treatment as it travels from this zone toward the outlet of the furnace, so that separate cooling drum can be dispensed with. When very high pressure is used, the nozzle may even be arranged close to the outlet of the furnace. This arrangement enables more favorable utilization of the chamber of the drum.

The accompanying drawing illustrates by way of example, one form of rotary furnace embodying my improvements.

The figure is a vertical longitudinal section.

$a$ is a rotary furnace tube, which is fed more or less continuously with the material to be treated by means of a chute or pipe $b$. A nozzle $c$ extends into the other end of the furnace tube and the fuel is blown through this nozzle under increased pressure into the furnace tube. The material fed from the pipe $b$ is caused by the slope and rotary motion of the furnace tube to travel through the burning, partial cooling and final cooling zones, and leaves the lower end of the tube in a sufficiently cooled condition.

Having thus described my invention, what I claim as new and desire to secure by Letters Patent is:

The process of treating ores and the like in a rotary furnace, consisting in feeding the material under a slope from one end of the furnace and the fuel under such high pressure from the other end thereof that the inlet velocity of the fuel exceeds the propagation velocity of the flame to such an extent that the reducing zone is transferred toward the back part of the furnace, whereby the burning, partial and final cooling zones will all be formed in the same furnace.

In testimony whereof I have affixed my signature in presence of two witnesses.

ARNO GÜNZEL.

Witnesses:
 HENRY HARPER,
 HANS HEIMANN.